(12) United States Patent
Mak et al.

(10) Patent No.: US 7,192,468 B2
(45) Date of Patent: Mar. 20, 2007

(54) CONFIGURATIONS AND METHOD FOR IMPROVED GAS REMOVAL

(75) Inventors: John Mak, Santa Ana, CA (US); Curt Graham, Mission Viejo, CA (US); Richard Nielsen, Laguna Niguel, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 93 days.

(21) Appl. No.: 10/478,350

(22) PCT Filed: Apr. 15, 2002

(86) PCT No.: PCT/US02/12050

§ 371 (c)(1),
(2), (4) Date: Jun. 14, 2004

(87) PCT Pub. No.: WO03/089115

PCT Pub. Date: Oct. 30, 2003

(65) Prior Publication Data

US 2005/0000360 A1    Jan. 6, 2005

(51) Int. Cl.
*B01D 53/14* (2006.01)

(52) U.S. Cl. .............................. 95/160; 95/163; 95/172; 95/177; 95/228; 95/236; 96/242

(58) Field of Classification Search .................. 95/160, 95/163, 172, 177, 169, 236, 191, 192, 203, 95/204, 228; 96/234, 242; 423/220, 226
See application file for complete search history.

(56) References Cited

U.S. PATENT DOCUMENTS

| | | | | |
|---|---|---|---|---|
| 3,664,091 A | * | 5/1972 | Hegwer | 95/161 |
| 3,910,777 A | * | 10/1975 | Jakob | 95/161 |
| 4,496,371 A | * | 1/1985 | Urban et al. | 95/174 |
| 4,533,373 A | * | 8/1985 | Butz et al. | 62/625 |
| 4,576,615 A | * | 3/1986 | Netzer et al. | 95/174 |
| 5,820,837 A | * | 10/1998 | Marjanovich et al. | 423/220 |

OTHER PUBLICATIONS

Internet document "Supercritical Fluid," http://en.wikipedia.org/wiki/Supercritical_fluid, Mar. 2006.*

* cited by examiner

*Primary Examiner*—Frank M. Lawrence
(74) *Attorney, Agent, or Firm*—Rutan & Tucker, LLP

(57) ABSTRACT

A plant includes an absorber (103) that operates in a gas phase supercritical region and removes an acid gas from a feed stream (9) at high recovery of the feed stream (10) while producing a high purity acid gas stream (36). Particularly preferred plants include gas purification plants that receive a feed gas with at least 5 mol % carbon dioxide at a pressure of at least 3000 psi.

25 Claims, 2 Drawing Sheets

CONFIGURATIONS AND METHOD FOR IMPROVED GAS REMOVAL

FIELD OF THE INVENTION

The field of the invention is removal of acid gas from various gas streams.

BACKGROUND OF THE INVENTION

Acid gas removal from various gas streams, and especially removal of carbon dioxide from natural gas streams has become an increasingly important process as the acid gas content of various gas streams increases. For example, the carbon dioxide concentration in natural gas from enhanced oil recovery will typically increase from 10% to about 60%. There are numerous processes for acid gas removal known in the art, and all or almost all of those may be categorized into one of three categories.

In the first category, one or more membranes are used to physically separate the acid gas from a gaseous feed stream. A typical membrane system includes a pre-treatment skid and a series of membrane modules. Membrane systems are often highly adaptable to accommodate treatment of various gas volumes and product-gas specifications. Moreover, membrane systems are relatively compact, therefore rendering membrane systems an especially viable option for off-shore gas treatment. However, membrane systems are susceptible to deterioration from heavy hydrocarbons content in the feed gas. Moreover, carbon dioxide removal to relatively low carbon dioxide content typically requires multiple stages of membrane separators and recompression between stages, which tend to be relatively expensive.

In the second category, a chemical solvent is employed that reacts with the acid gas to form a (typically non-covalent) complex with the acid gas. In processes involving a chemical reaction between the acid gas and the solvent, the crude gases are typically scrubbed with an alkaline salt solution of a weak inorganic acid as, for example, described in U.S. Pat. No. 3,563,695, or with alkaline solutions of organic acids or bases as, for example, described in U.S. Pat. No. 2,177,068. Such chemical reaction processes generally require heat regeneration and cooling of the chemical solvents, and often involve recirculation of large amounts of chemical solvent. Moreover, the quantity of chemical solvent required to absorb increasing amounts of acid gases generally increases significantly, thus making use of chemical solvents problematic where the acid gas content increases over time in the feed gas.

In the third category, a physical solvent is employed for removal of acid gas from a feed gas, wherein the acid gas does react in an appreciable amount with the solvent. The physical absorption of the acid gas predominantly depends upon use of solvents having selective solubilities for the particular acid gas (e.g., $CO_2$ or $H_2S$) gaseous components to be removed and is further dependent upon pressure and temperature of the solvent. For example, methanol may be employed as a low-boiling organic physical solvent, as exemplified in U.S. Pat. No. 2,863,527. However, the energy input requirements for cooling are relatively high, and the process generally exhibits greater than desired methane and ethane absorption, thereby necessitating large energy inputs for recompression and recovery.

Alternatively, physical solvents may be operated at ambient or slightly below ambient temperatures, including propylene carbonates as described in U.S. Pat. No. 2,926,751 and those using N-methylpyrrolidone or glycol ethers as described in U.S. Pat. No. 3,505,784. While such solvents may advantageously reduce cooling requirements, most propylene carbonate-based absorption processes are limited to absorption pressures of less than 1000 psi (i.e., at sub-critical pressure). In further known methods, physical solvents may also include ethers of polyglycols, and specifically dimethoxytetraethylene glycol as shown in U.S. Pat. No. 2,649,166, or N-substituted morpholine as described in U.S. Pat. No. 3,773,896. While use of physical solvents avoids at least some of the problems associated with chemical solvents and/membranes, various new difficulties arise. Among other things, carbon dioxide removal from high pressure feed gases is often limited to sub-critical pressures. Furthermore, as the water content increases, freezing may occur in the solvent circuit, thus necessitating a relatively high temperature and thereby reducing the efficiency of the absorption process. In another aspect, physical solvent generally requires steam or external heat for solvent regeneration in order to produce a very lean solvent suitable for removal of acid gas to the ppm level.

Thus, although various configurations and methods are known to remove acid gases from a feed gas, all or almost all of them suffer from one or more disadvantages. Therefore, there is still a need to provide methods and configurations for improved acid gas removal.

SUMMARY OF THE INVENTION

The present invention is directed towards methods and configurations of a plant in which an acid gas component is removed from a feed stream, wherein the feed stream comprises at least 5 mol % carbon dioxide and has a pressure of at least 1000 psi.

In one aspect of the inventive subject matter, a plant comprises an absorber operating in a gas phase supercritical region and receiving a dehydrated feed gas comprising at least 5 mol % carbon dioxide, wherein a physical solvent absorbs at least part of the carbon dioxide in the absorber to form a carbon dioxide stream containing at least 95 mol % carbon dioxide.

The feed gas in such configurations is preferably cooled to a temperature above the hydrate point of the feed gas for removal of the majority of the water content, and the cooled feed gas is then dehydrated in a dehydration unit before entering the absorber. It is further preferred that the feed gas (e.g., natural gas) has a pressure of between about 3000 psig to about 5000 psig.

Particularly preferred physical solvents include propylene carbonate, and it is contemplated that the absorber forms a rich solvent from the physical solvent that is depressurized, thereby providing cooling of a carbon dioxide stream and further providing a first hydrocarbon recycle stream that is fed into the absorber. In yet other aspects, the depressurized rich solvent is further depressurized, thereby providing cooling of the solvent in the absorber and further providing a second hydrocarbon recycle stream that is fed into the absorber. The further depressurized rich solvent may then be let down and can be separated in a separator to form a lean solvent and the carbon dioxide stream.

Where hydrocarbon recycle streams are generated, it is contemplated that such streams will be compressed in a compressor to the pressure of the absorber, and that the compressed combined recycle stream can then be mixed with the dehydrated feed gas. The lean solvent in preferred configurations may be treated in a vacuum stripping unit using a stripping gas, thereby regenerating the physical solvent for the absorber and further generating a fuel gas, and the product gas from the absorber may cool the feed gas. While not limiting to the inventive subject matter, it is further preferred that the product gas comprises at least 99% of the natural gas, and that the carbon dioxide stream is employed in an enhanced oil recovery.

Where a very low acid gas specification is required of the product gas, it is contemplated that the lean solvent in preferred configurations comprises at least two streams from the vacuum stripper. A partially stripped solvent is generated in the upper section of the stripping column that is pumped to the middle section of the absorber, and an ultra stripped lean solvent from the lower section of the stripping column is pumped and cooled and sent to the top of the absorber. Such ultra stripped lean solvent configurations produce a product gas that will meet a ppm level acid gas specification that is previously achievable only with heat regenerated solvent.

Consequently, in another aspect of the inventive subject matter, a gas treating plant may comprise an absorber receiving a feed gas at a pressure of at least 1000 psi and comprising at least 5 mol % carbon dioxide, wherein the absorber employs a physical solvent to produce a rich solvent and a product gas that is at least partially depleted from the carbon dioxide. Suitable plants may further include a first turbine that depressurizes the rich solvent and a first separator that separates a first hydrocarbon portion from the depressurized rich solvent, thereby producing a first hydrocarbon recycle stream and a first rich solvent, and a second turbine that further depressurizes the first rich solvent and a cooler that employs the further depressurized first solvent to cool the physical solvent to maintain a bottom temperature of the absorber in a desired temperature range. In such configurations, it is preferred that the further depressurized first solvent is separated in a second separator that separates a second hydrocarbon portion from the further depressurized first solvent, thereby producing a second hydrocarbon recycle stream and a second rich solvent, and wherein the first and second hydrocarbon recycle streams are fed into the absorber.

Thus, a method of operating a plant may include one step in which an absorber is provided that receives a feed gas at a pressure of at least 1000 psi and comprises an acid gas. In another step, at least part of the acid gas is removed from the feed gas using a physical solvent, thereby forming a product gas and a rich solvent, and in still another step, the pressure of the rich solvent is reduced to form a hydrocarbon recycle stream that is fed into the absorber, thereby producing a depressurized rich solvent. In a further step, the depressurized rich solvent is used to cool the physical solvent, thereby maintaining a bottom temperature of the absorber in a desired temperature range and forming a heated depressurized rich solvent, and in yet another step, the heated depressurized rich solvent is separated into a stream containing at least a portion of the acid gas, thereby forming a lean solvent. Yet in another step, the lean solvent is depressurized to a vacuum stripper, which produces a partially stripped lean solvent and an ultra stripped lean solvent that are fed to two different locations in the absorber. The stripper overhead gas can be used as a plant fuel gas.

DETAILED DESCRIPTION

The inventors have discovered that acid gases can be removed from a feed stream having high pressure and a carbon dioxide content of at least 5 mol % using methods and configurations comprising an absorber that operates in a gas phase supercritical region and receives a dehydrated feed gas comprising at least 5 mol % carbon dioxide, wherein a physical solvent absorbs at least part of the carbon dioxide in the absorber to form a carbon dioxide stream containing at least 95 mol % carbon dioxide.

Figure 1:
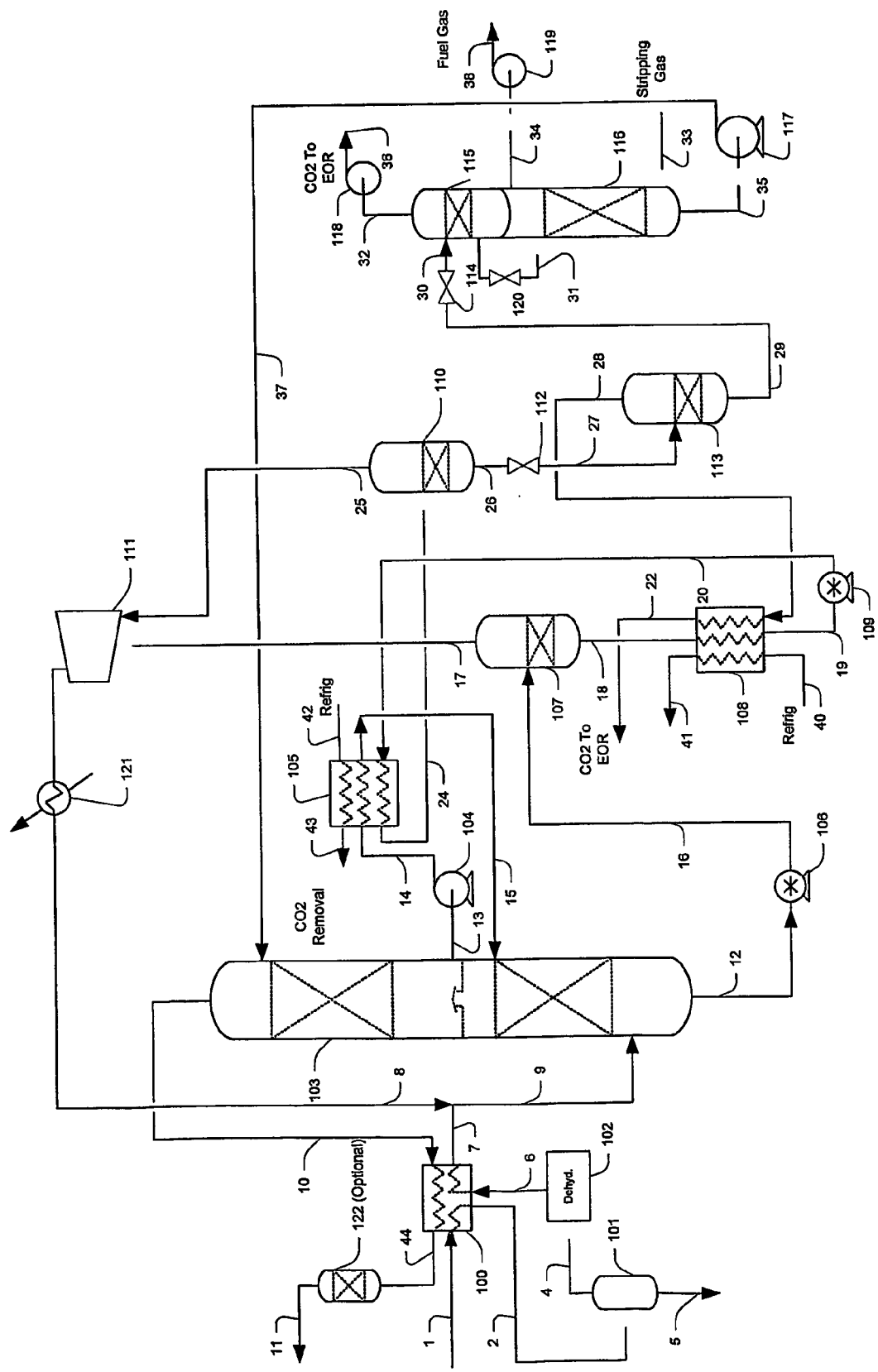
FIG. 1 is a schematic diagram of an exemplary configuration according to the inventive subject matter.

In a preferred configuration as depicted in FIG. 1, a plant comprises a feed cooler 100 that cools feed gas 1 from 100° F. to 60° F., just above the feed gas hydrate point The cooling source for cooler 100 is provided by the product gas 10 (i.e., the absorber overhead gas stream leaving the cooler via line 44), typically at −20° F. Water is removed from the cooled feed gas 2 in feed gas separator 101 via line 5 (An optional $H_2S$ scavenger bed may provides additional $H_2S$ removal). The so partially dehydrated and cooled feed gas 4 is then further dried in a dehydration unit 102 operating at high pressure (e.g., feed gas pressure). The dehydrated feed gas 6 is further cooled to about 30° F. in cooler 100 and via line 7 mixed with combined recycle stream 8 (see below), which is fed via line 9 to the bottom of absorber 103. A side cooler pump 104 pumps the rich solvent from a location above the gas feed tray via lines 13 and 14 to the side cooler 105, which cools the rich solvent. The cooled rich solvent is returned to the absorber via line 15.

It is especially preferred that the source of coolant for the side cooler 105 is from the flashed rich solvent stream 20 (further depressurized rich solvent stream) from second hydraulic turbine 109. However, it should be recognized that cooling may be supplemented by an external source (e.g., via stream 42). Thus, suitable coolers may be configured to maintain a constant absorber bottom temperature (e.g., 10 to 40° F.) for effective absorption of the acid gas. First hydraulic turbine 106 reduces the absorber bottoms pressure to 350 to 700 psig, thus cooling the rich solvent 12 to about 5° F. to 35° F. and forming a depressurized rich solvent stream 16. Flashed hydrocarbon vapors (first hydrocarbon recycle stream 17) from the first separator 107 are recovered to the absorber 103 via recycle compressor 111. The flashed solvent (first rich solvent 18) from the first separator 107 is cooled by carbon dioxide vapor 28 from the separator 113 in cooler 108. Optional additional cooling may be provided from an external source via stream 40. The solvent in line 19 is cooled to about 0° F. to 30° F., which is further reduced in pressure to about 150 to 300 psig using second hydraulic turbine 109, which cools the first rich solvent 18 to about −2° F. to 28° F., thus forming a further depressurized rich solvent stream 20. The further depressurized rich solvent stream 20 is then used to provide the cooling requirement in the side cooler 105. After leaving the side cooler 105, the rich solvent stream 24 is separated in the second separator 110, while the flashed hydrocarbon vapors (second hydrocarbon recycle stream 25) from second separator 110 are recovered to the absorber via recycle compressor 111. The recycle compressor 111 discharges to a cooler 121 to stream 8 (i.e., the combined recycle stream) is then mixed with the cooled and dehydrated feed gas from line 7 to form combined feed stream 9, which is fed to the absorber 103.

The flashed solvent (second rich solvent 26) from the second separator 110 is reduced in pressure by JT valve 112 to line 27 and separated in the separator 113 operating at atmospheric pressure. The flashed vapors in stream 28 (carbon dioxide stream) from the separator 113 (operating at −23° F. to 0° F.) will contain over 95% $CO_2$. The refrigerant content in stream 28 is recovered in cooler 108. The warmed flashed vapor is used for enhanced oil recovery via line 22. Lean (flashed) solvent liquid 29 from the separator 113 is reduced in pressure by JT valve 114 to stream 30.

Figure 2:
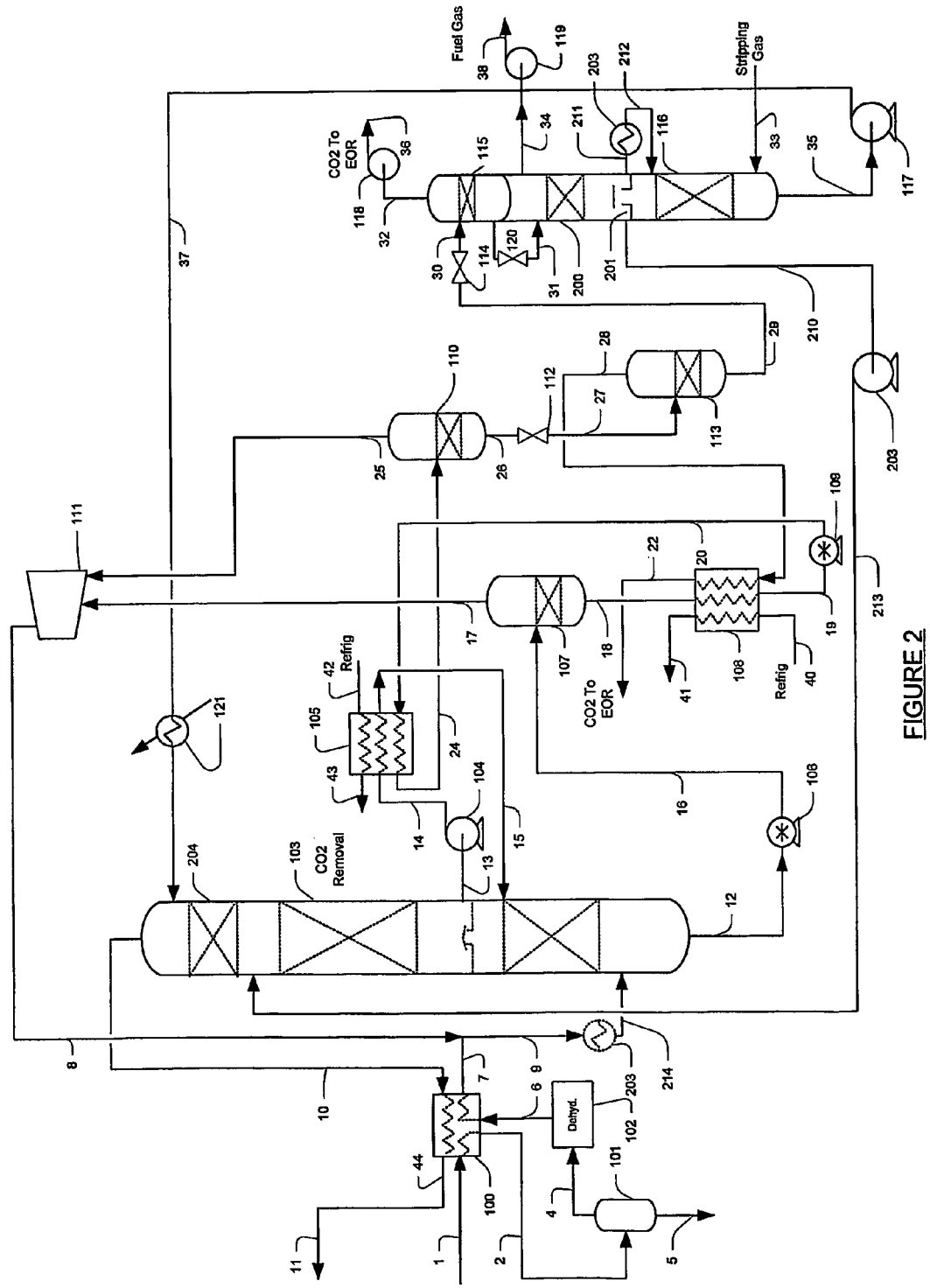
FIG. 2 is a schematic diagram of an exemplary ultra stripped lean solvent process.

The vacuum separator 115 operates at vacuum pressure at 0.7 to 7.0 psia. Vacuum is maintained by a liquid seal vacuum pump 118. The vent gas in lines 32 and 36 will contain over 95% $CO_2$ which may be used for enhanced oil recovery. The flashed solvent liquid from the vacuum separator 115 is sent via line 31 to a stripper operating at 0.4 to 6.7 psia (The stripping gas containing mostly methane, can be drawn from the treated gas stream from the absorber). The amount of stripping gas 33 (lean gas) used is typically less than 0.5% of the total feed gas. The stripped gas from the stripper 116 will contain about 30 to 50% $CO_2$ and may be used as fuel gas 34 after compression to fuel pressure by fuel gas compressor 119. The stripped lean solvent 35 from the stripper 116 will contain 0.1 to 0.02 mol percent of $CO_2$ in the solvent, is pumped to the absorber pressure (preferably between about 1000 to 4000 psig), and reintroduced into the absorber 103 via line 37. The power generated from the first and second hydraulic turbines 106 and 109 can be used to provide part of the power requirement of the lean solvent pump 117, the vacuum pump 36, and the fuel gas compressor 119.

Where a ppm level acid gas content specification is required of the product gas, an ultra stripped solvent configuration as shown in FIG. 2 can be used. Such configurations are typically based on exemplary configurations as shown in FIG. 1, with the inclusion an advanced stripper configuration that can produce an ultra lean solvent for acid gas absorption. The stripper column generally has an upper section 200 and a lower section 116, separated by a collector tray 201. Stripping section 200 produces a partially stripped solvent that is collected in the collecting tray 201. Stream 201, typically 50% to 80% of the total solvent flow is withdrawn from the collecting tray by a lean solvent pump 203, and fed to the middle section of the absorber 103. The residual stream 211, typically 20% to 50% of the total solvent flow, is heated in heat exchanger 203 to typically about 55° F. with feed gas stream 9. The feed gas is cooled in exchanger 203 to produce stream 214 typically −10° F. to 20° F. Since the gas has been dried in dehydration unit 102, freezing of water is in all or almost all cases not a problem. Thus, it should be especially recognized that an integrated stripper column produces two stripped solvent streams that are fed to different locations in the absorber, thereby producing a very lean solvent by maintaining a high vapor to liquid ratio in the lower stripping section.

With respect to suitable feed gases, it is contemplated that numerous natural and synthetic feed gases are appropriate. However, particularly preferred feed gases include natural gas, and especially natural gas with a carbon dioxide that is at least about 5 mol %, more typically at least 10 about mol %, and most typically at least 20 about mol %. Therefore, especially suitable feed streams include natural gas feed streams from oil fields such as Prudhoe Bay, Ak., or Orman Lange, Norway. Similarly, the acid gas content (and especially carbon dioxide content) of suitable feed gases may vary and will predominantly depend on the source of the feed gas. It is generally preferred, however, that the acid gas content will be at least about 5 mol %, more typically at least 10 about mol %, and most typically at least 20 about mol %. An exemplary feed stream composition is provided in Table 1 below.

TABLE 1

| | Mol % |
|---|---|
| $N_2$ | 0.88 |
| $CO_2$ | 19.14 |
| $H_2S$ | 0.00 |
| $C_1$ | 72.69 |
| $C_2$ | 5.29 |
| $C_3$ | 1.40 |
| $iC_4$ | 0.22 |
| $nC_4$ | 0.26 |
| $iC_5$ | 0.02 |
| $nC_5$ | 0.01 |
| $C_6$ | 0.08 |

Furthermore, it should be recognized that the pressure of contemplated feed gases may vary considerably, and suitable pressures will range between atmospheric pressure and several thousand psi. However, it is particularly preferred that the feed gas has a pressure of at least 1000 psig, more typically at least 2000 psig, even more typically at least 3000 psig, and most typically at least 5000 psig. Moreover, while it is generally contemplated that at least a portion of the feed gas pressure is due to the pressure of the gas contained in the well, it should also be recognized that where appropriate, the pressure may also be increased using one or more compressors.

In yet further contemplated aspects, the feed stream is cooled before entering the absorber, and it is especially preferred that the cooling of the feed stream will be at least in part effected by the product gas (i.e., the absorber overhead stream) in a heat exchanger. With respect to the degree of cooling, it is generally contemplated that the feed stream may be cooled to various temperatures. However, it is generally preferred that the feed stream will be cooled to a temperature just above the gas hydrate point. Consequently, the cooled feed gas stream may be fed into a separator in which at least a portion of the water contained in the feed gas is removed from the cooled feed stream to form a partially dehydrated feed gas. The so formed partially dehydrated feed gas may then be further dehydrated in a dehydration unit, and it should be recognized that all known gas dehydration units are suitable for use. For example, further dehydration may be performed using glycol or molecular sieves. In still further preferred aspects, it is contemplated that the dehydrated feed gas may be further cooled prior to entering the absorber. In especially preferred contemplated configurations, the dehydrated feed gas is cooled in a heat exchanger, wherein the refrigeration is provided by the product gas (i.e., the absorber overhead stream). Dehydration of the feed gas is particularly advantageous because the absorption process can be run at significantly lower temperatures (e.g., −20° F. to 40° F. in the absorber) without water to freeze out in the solvent circuit. In preferred contemplated configurations for acid gas removal to a very low level, the dehydrated gas may be further cooled with a partially stripped the lean solvent from the ultra stripper process. Furthermore, operation of the absorber bottom at a lower temperature will allow operation of the absorber at a reduced solvent circulation, thus increasing efficiency.

Further preferred configurations may additionally include sulfur removal units (e.g., via a scavenger bed or an additional absorber with a sulfur-specific solvent), and particularly contemplated sulfur removal units remove at least a portion of hydrogen sulfide contained in the feed gas (e.g., at a location upstream of the absorber). Alternatively, with the use of ultra stripper configuration (see above), the process can produce a treated gas with a very low acid gas content without the help of the sulfur removal units.

Thus, it should be particularly recognized that suitable absorbers will operate at relatively high pressure, and especially contemplated high pressures are at least 1000 psi, typically at least 2000 psi, even more typically at least 3000 psi, and most typically at least 5000 psi. Consequently, it should be recognized that contemplated absorbers will operate in a gas phase supercritical region. The term "operate in a gas phase supercritical region" as used herein refers to operation of the absorber under conditions in which at least a portion of the feed gas, if not all of the feed gas, will be in the supercritical state where physical liquid and gas phase do not exist. Furthermore, by operating the absorption process in the gas phase supercritical region, hydrocarbon condensation is typically avoided, which currently presents a significant problem in heretofore known processes. In further contemplated aspects, the type of absorber need not be limited to a particular configuration, and all known absorber configurations are deemed suitable for use herein. However, particularly preferred contacting devices include a packed bed or tray configurations.

With respect to the solvent employed in contemplated absorbers, it should be recognized that all physical solvents and mixtures thereof are appropriate. There are numerous physical solvents known in the art, and exemplary preferred physical solvents include propylene carbonate, tributyl phosphate, normal methyl pyrrolidone, dimethyl ether of polyethylene glycol, and/or various polyethylene glycol dialkyl ethers. Alternatively, other solvents including enhanced tertiary amine (e.g., Piperazine) or other solvent may be employed having similar behavior as physical solvent.

Consequently, the absorber will provide a product gas that is depleted from acid gases, and particularly depleted from carbon dioxide. Moreover, it should be recognized that since the absorber receives a cooled and dehydrated feed gas, the product gas will typically conform with all or almost all sales gas specifications and requirements for transportation through high-pressure pipelines, or as feed gas to an LNG plant. It should further be especially appreciated that the rich solvent formed in the absorber will leave the absorber bottom at relatively high pressure (e.g., at least 1000 psi, more typically between 2000 and 5000 psi), and may thus be utilized to provide work (e.g., for generation of electrical energy) and/or cooling of various streams in the separation process. In especially preferred configurations, the rich solvent is let down in pressure using a first hydraulic turbine to generate mechanical or electric energy, and the depressurized rich solvent is then separated in a separator into a hydrocarbon-containing first recycle stream and a first rich solvent, which is subsequently employed as a coolant to refrigerate a carbon dioxide stream (wherein the carbon dioxide is produced from the feed gas). The hydrocarbon-containing first recycle stream is preferably recycled to the absorber, while the first rich solvent is further depressurized using a second hydraulic turbine to further generate mechanical or electric energy. The so further depressurized rich solvent stream is then employed as a refrigerant in a heat exchanger (preferably side cooler of the absorber) that cools the rich solvent in the absorber to maintain a desirable absorber bottoms temperature. After passing through the heat exchanger, the further depressurized rich solvent stream is then separated in a second separator into a second rich solvent and a second hydrocarbon-containing recycle stream that is recycled to the absorber. Consequently, it should be recognized that the rich solvent stream is employed to produce at least one or work and cooling using the high pressure before the rich solvent is flashed and regenerated.

Flashing of the rich solvent may be performed in various configurations, and it is generally contemplated that all known configurations are suitable for use herein. However, it is typically preferred that the rich solvent is (after providing work and/or cooling) further let down in pressure to a pressure sufficient to release at least 80% (more typically at least 90%, and most typically at least 95%) of the dissolved carbon dioxide. The so produced carbon dioxide is then separated in a separator (typically operating at atmospheric pressure) from the lean solvent. It should be especially appreciated that the so generated carbon dioxide stream has a carbon dioxide content of over 90%, and more typically of at least 95%. Consequently, the so formed carbon dioxide stream is especially suited to be employed in enhanced oil recovery process.

In further contemplated aspects of the inventive subject matter, the lean solvent from the separator is further let down in pressure via JT valve and fed into a vacuum separator. Preferred vacuum separators operate at a pressure of between about 0.7 to 7.0 psia, which is generated by a liquid seal vacuum pump. Residual carbon dioxide (typically with a purity of at least 95%) from the lean solvent is removed in the vacuum separator and may also be employed in enhanced oil recovery as depicted in FIG. 1. The physical solvent is then regenerated in a stripper and recirculated to the absorber via a lean solvent pump. In particularly preferred configurations, the stripper uses a lean gas (e.g., a portion of the product gas) as a stripping gas to produce a fuel gas. However, in alternative configurations, various gases other than the product gas are also suitable, including gases from other streams within the plant and even nitrogen or air. It should be further appreciated that the use of a vacuum separator in combination with a gas stripper in such configurations produces a very lean solvent with a $CO_2$ concentration of typically less than 1000 ppmv.

In a further contemplated aspects, and especially where a gas is treated to ppm level acid gas specification, an ultra stripped solvent configuration may include an advanced stripper comprising at least two sections separated by a collector tray, producing a partially stripped solvent and an ultra stripped solvent that are fed to different locations in the absorber. It should be further appreciated that the use of a vacuum separator in combination with an ultra stripper in such configurations will produce an ultra lean solvent with a $CO_2$ concentration of typically less than 100 ppmv.

Thus, in particularly preferred configurations and where the feed gas comprises natural gas, it should be appreciated that the product gas comprises at least 90%, more typically at least 95%, and most typically at least 99% of the natural gas present in the feed gas. While not wishing to be bound be any theory or hypothesis, it is contemplated that such relatively high natural gas recovery in the product gas is achieved by providing at least one, and more preferably two hydrocarbon-containing recycle streams back to the absorber. Consequently, the purity of the produced carbon dioxide stream is relatively high, and so formed carbon dioxide streams will typically comprise at least 90%, and more typically at least 95% $CO_2$.

Suitable recycle gas compressors are all compressors that are capable of compressing. the first and second hydrocarbon-containing recycle gas streams to a pressure equal or about the pressure of the cooled and dehydrated feed gas. Similarly, it is contemplated that the lean solvent pump will provide solvent pressure suitable for introduction of the lean solvent into the absorber.

Consequently, a plant may comprise an absorber receiving a feed gas at a pressure of at least 1000 psi and comprising at least 5 mol % carbon dioxide, wherein the absorber employs a physical solvent to produce a rich solvent and a product gas that is at least partially depleted from the carbon dioxide. Contemplated plants may further comprise a first turbine that depressurizes the rich solvent and a first separator that separates a first hydrocarbon portion from the depressurized rich solvent, thereby producing a first hydrocarbon recycle stream and a first rich solvent, and a second turbine that further depressurizes the first rich solvent and a cooler that employs the further depressurized first solvent to cool the physical solvent to maintain a bottom temperature of the absorber in a desired temperature range, wherein the further depressurized first solvent is separated in a second separator that separates a second hydrocarbon portion from the further depressurized first solvent, thereby producing a second hydrocarbon recycle stream and a second rich solvent, and wherein the first and second hydrocarbon recycle streams are fed into the absorber.

With respect to the feed gas, the absorber, the physical solvent, the carbon dioxide stream, and various other components, the same consideration as discussed above apply. Thus, particularly contemplated feed gas is at least partially dehydrated and cooled by the product gas, and may further be dehydrated in a dehydration unit before entering the absorber. Furthermore, contemplated first rich solvents may be employed as a refrigerant to cool a carbon dioxide stream, while contemplated second rich solvents may be further depressurized to remove at least part of the carbon dioxide, thereby forming a lean solvent (which may be further processed in a vacuum separator that employs a lean gas and produces a fuel gas, thereby regenerating the physical solvent). Particularly contemplated physical solvents include propylene carbonate, and it is especially preferred that the carbon dioxide is employed in an enhanced oil recovery.

Thus a method of operating a plant may include one step in which an absorber is provided that receives a feed gas at a pressure of at least 1000 psi and comprises an acid gas. In another step, at least part of the acid gas is removed from the feed gas using a physical solvent, thereby forming a product gas and a rich solvent, and in a still further step, the pressure of the rich solvent is reduced to form a hydrocarbon recycle stream that is fed into the absorber, thereby producing a depressurized rich solvent. In yet another step, the depressurized rich solvent is used to cool the physical solvent, thereby maintaining a bottom temperature of the absorber in a desired temperature range and forming a heated depressurized rich solvent, and in a still further step, the heated depressurized rich solvent is separated into a stream containing at least a portion of the acid gas, thereby forming a lean solvent.

With respect to the feed gas, the absorber, the physical solvent, the carbon dioxide stream, and various other components, the same consideration as discussed above apply. Thus, particularly contemplated feed gas may have a pressure of between about 3000 psi and about 5000 psi. Contemplated acid gases especially include carbon dioxide, and physical solvents include propylene carbonate. In further contemplated aspects, the lean solvent is treated in a vacuum separator using lean gas, thereby producing a fuel gas and regenerating the physical solvent.

Consequently, it is contemplated that configurations according to the inventive subject matter will significantly reduce overall energy consumption and capital cost as compared to conventional $CO_2$ removal processes at high feed gas pressure using amine or other physical solvents or membranes. Moreover, contemplated configurations and processes will typically not require a heat source, thereby further reducing energy consumption. Still further, enhanced oil recovery projects will frequently encounter an increase in $CO_2$ concentration in the feed gas, typically from 10% up to as high as 60%. Contemplated configurations and processes can accommodate these changes with substantially same solvent circulation.

Moreover, contemplated configurations generally provide a non-corrosive process since due to operation at low temperature and lack of water in the physical solvent. In contrast, conventional amine units for carbon dioxide removal are generally more complex to operate and maintain as such processes tend to be corrosive and often require antifoam and anti-corrosion injections during operation. Still further, another advantage of contemplated physical solvent processes is that, unlike amine processes, the solvent circulation rate is insensitive to increases in $CO_2$ partial pressure (e.g., the physical solvent rate required to treat 100 MMSCFD of gas containing 20% $CO_2$ is substantially the same as that required to treat 100 MMSCFD of gas containing 60% $CO_2$. The $CO_2$ loading in the solvent merely increases with increasing $CO_2$ concentration in the feed gas. In an amine unit design, the amine circulation rate would approximately triple as the $CO_2$ loading in the rich amine solvent must be maintained).

Yet another advantage of contemplated physical solvent processes is their simplicity and resistance to freezing compared to known amine treating processes, thus requiring less supporting offsites and utility systems, such as steam boilers. For example, contemplated configurations typically require only refrigeration, and the inventors contemplate operation of the plant without hot oil system for solvent regeneration if the residual $CO_2$ content is in the 5 to 10 psia range. Furthermore, when operating at a relatively high $CO_2$ feed gas, the refrigeration requirement for solvent cooling may be entirely eliminated, as the flashing of $CO_2$ from solvent regeneration will provide the necessary cooling.

Yet another advantage of the invention is treating to meet the feed gas specification to an LNG plant that requires $CO_2$ is in the 50 ppmv range and H2S in the 4 ppmv range. The inclusion of the ultra stripper as described in the current invention is directly applicable.

Thus, specific embodiments and applications for configurations and methods for improved acid gas removal have been disclosed. It should be apparent, however, to those skilled in the art that many more modifications besides those already described are possible without departing from the inventive concepts herein. The inventive subject matter, therefore, is not to be restricted except in the spirit of the appended contemplated claims. Moreover, in interpreting both the specification and the contemplated claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:
1. A plant comprising:
   an absorber that is configured to operate at a pressure that is supercritical for natural gas having a carbon dioxide content of between 10 mol % and 60 mol %, wherein the supercritical pressure is at least 2000 psig;

a gas source that is configured to provide a dehydrated natural gas-containing feed gas to the absorber at the supercritical pressure;

wherein the absorber is configured to produce a physical solvent that contains at least part of the carbon dioxide; and a separator fluidly coupled to the absorber and configured to form a lean solvent and a carbon dioxide stream containing at least 95 mol % carbon dioxide from the physical solvent.

2. The plant of claim 1 further comprising an exchanger that is configured to cool the feed gas to a temperature above a hydrate point of the feed gas, and a dehydration unit that is configured to dehydrate the cooled feed gas before entering the absorber.

3. The plant of claim 1 wherein the gas source is configured to provide the feed gas at a pressure of at least 3000 psi.

4. The plant of claim 1 wherein the feed gas comprises natural gas.

5. The plant of claim 1 wherein the absorber is configured to employ propylene carbonate as physical solvent.

6. The plant of claim 1 further comprising a heat exchanger that is configured to provide cooling to the physical solvent using refrigeration content of the carbon dioxide stream.

7. The plant of claim 6 further comprising a second heat exchanger that is configured to provide cooling of the physical solvent in the absorber using refrigeration content of the cooled physical solvent.

8. The plant of claim 1 further comprising a hydraulic turbine that is configured to produce work from expansion of the physical.

9. The plant of claim 1 further comprising a vacuum separator that is configured to regenerate the physical solvent using lean gas and to thereby generate a fuel gas.

10. The plant of claim 2 wherein the absorber produces a product gas, and wherein the exchanger is further configured to cool the feed gas using the product gas.

11. The plant of claim 10 wherein the feed gas comprises natural gas, and wherein the absorber is configured to produce a product gas that comprises at least 99% of the natural gas.

12. The plant of claim 1 wherein the plant is further fluidly coupled to an enhanced oil recovery unit, and wherein the carbon dioxide stream is fed to the enhanced oil recovery.

13. A plant comprising:

an absorber that receives a feed gas at a pressure of at least 1000 psi and comprising at least 5 mol % carbon dioxide wherein the absorber employs a physical solvent to produce a rich solvent and a product gas that is at least partially depleted from the carbon dioxide;

a first turbine that depressurizes the rich solvent and a first separator that separates a first hydrocarbon portion from the depressurized rich solvent, thereby producing a first hydrocarbon recycle stream and a first rich solvent;

a second turbine that further depressurizes the first rich solvent and a cooler that employs the further depressurized first solvent to cool the physical solvent to maintain a bottom temperature of the absorber in a desired temperature range; and wherein the further depressurized first solvent is separated in a second separator that separates a second hydrocarbon portion from the further depressurized first solvent, thereby producing a second hydrocarbon recycle stream and a second rich solvent, and wherein the first and second hydrocarbon recycle streams are fed into the absorber.

14. The plant of claim 13 wherein the feed gas is at least partially dehydrated.

15. The plant of claim 14 wherein the feed gas is cooled by the product gas and dehydrated in a dehydration unit before entering the absorber.

16. The plant of claim 13 wherein the first rich solvent is employed as a refrigerant to cool a carbon dioxide stream.

17. The plant of claim 13 wherein the second rich solvent is further depressurized to remove at least part of the carbon dioxide, thereby forming a lean solvent.

18. The plant of claim 17 wherein the lean solvent is further processed in a vacuum separator that employs a lean gas and produces a fuel gas, thereby regenerating the physical solvent.

19. The plant of claim 17 wherein the physical solvent comprises propylene carbonate.

20. The plant of claim 17 wherein the carbon dioxide is employed in an enhanced oil recovery.

21. The plant of claim 13 further comprising a stripper having at least two stripping sections separated by a collecting tray, and wherein the stripper regenerates the physical solvent.

22. A method of operating a plant, comprising:

providing an absorber that receives a feed gas at a pressure of at least 1000 psi wherein the feed gas comprises an acid gas;

removing at least part of the acid gas from the feed gas using a physical solvent, thereby forming a product gas and a rich solvent;

reducing pressure of the rich solvent to form a hydrocarbon recycle stream that is fed into the absorber, thereby producing a depressurized rich solvent;

using the depressurized rich solvent to cool the physical solvent, thereby maintaining a bottom temperature of the absorber in a desired temperature range and forming a heated depressurized rich solvent; and separating the heated depressurized rich solvent into a stream containing at least a portion of the acid gas, thereby forming a lean solvent.

23. The method of claim 22 wherein the feed gas has a pressure of between about 1000 psi and about 3000 psi.

24. The method of claim 22 wherein the acid gas is carbon dioxide.

25. The method of claim 22 wherein the physical solvent comprises propylene carbonate.

* * * * *